June 24, 1969 W. F. W. DIETZ 3,452,244

ELECTRON BEAM DEFLECTION AND HIGH VOLTAGE GENERATION CIRCUIT

Filed April 15, 1968 Sheet 1 of 2

INVENTOR
WOLFGANG F.W. DIETZ
BY Kenneth R. Schaefer
Attorney

INVENTOR
WOLFGANG F. W. DIETZ
BY Kenneth R. Schaefer
Attorney

United States Patent Office 3,452,244

Patented June 24, 1969

3,452,244

ELECTRON BEAM DEFLECTION AND HIGH VOLTAGE GENERATION CIRCUIT

Wolfgang F. W. Dietz, Indianapolis, Ind., assignor to Radio Corporation of America, a corporation of Delaware Filed Apr. 15, 1968, Ser. No. 721,383

Int. Cl. H01j *29/70*

U.S. Cl. 315—27 21 Claims

ABSTRACT OF THE DISCLOSURE

A solid state horizontal deflection and high voltage generating circuit for a television receiver. The circuit utilizes two bi-directionally conductive switching means which serve respectively as trace and commutating switches. Particularly, each of the switching means comprises the parallel combination of a silicon controlled rectifier (SCR) and a diode. The commutating switch is triggered on shortly before the desired beginning of retrace and, in conjunction with a resonant commutating circuit having an inductor and two capacitors, serves to turn off the trace switch to initiate retrace. The commutating circuit is also arranged to turn off the commutating SCR before the end of retrace.

This invention relates to electron beam deflection circuits, and in particular, to a deflection circuit further adapted for generation of the high voltage normally required for the ultor electrode of a cathode ray image reproducing tube or kinescope, the circuit utilizing a plurality of solid state semiconductor devices including one or more silicon controlled rectifiers.

The invention is particularly useful in connection with horizontal deflection circuits for television receivers of the type described in my copending U.S. patent application Ser. No. 577,375, entitled, "Electron Beam Deflection Circuit," filed Sept. 6, 1966, and assigned to the same assignee as the present invention. The present invention will be described further in connection with use in such apparatus.

Figure 1:
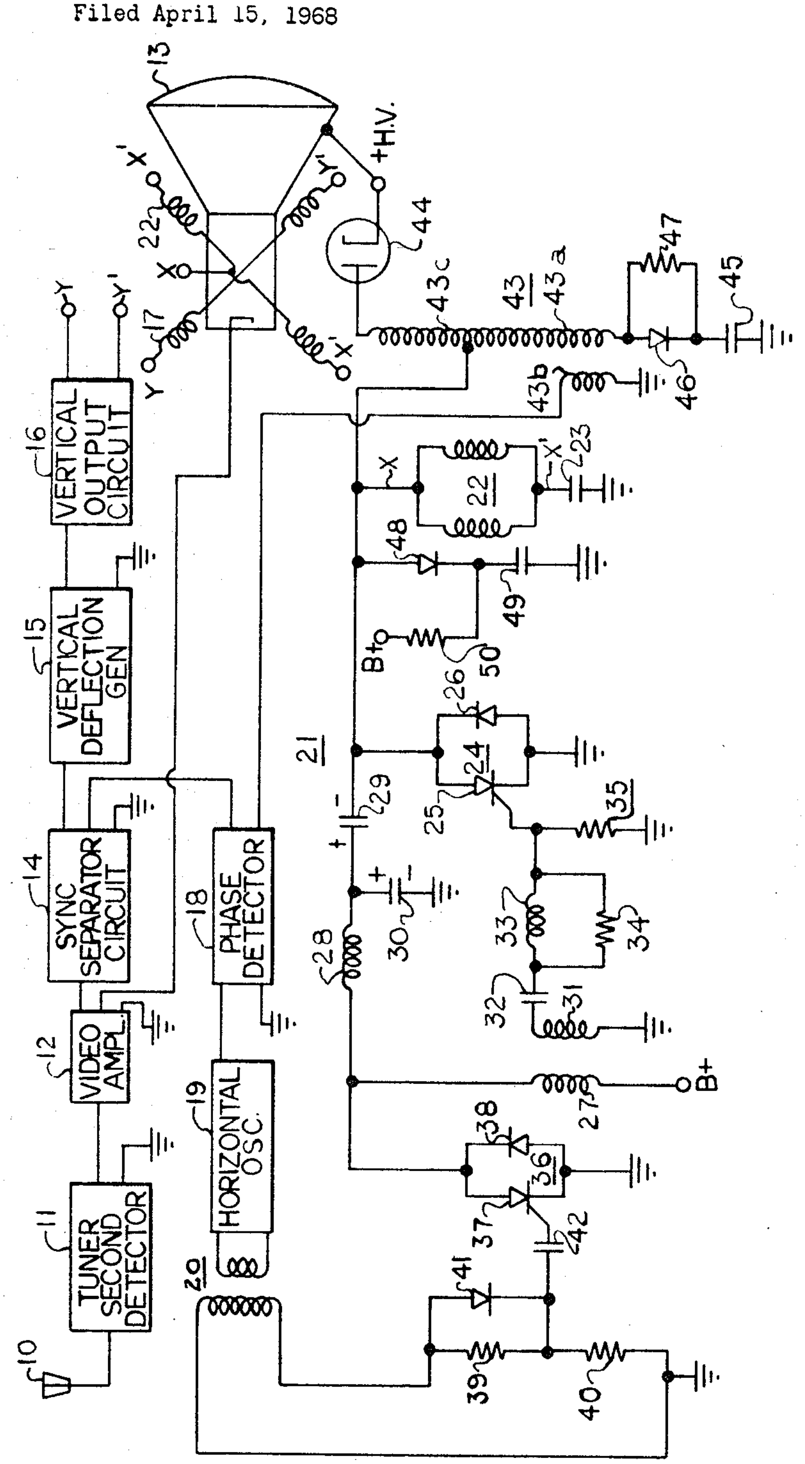
Figure 2:
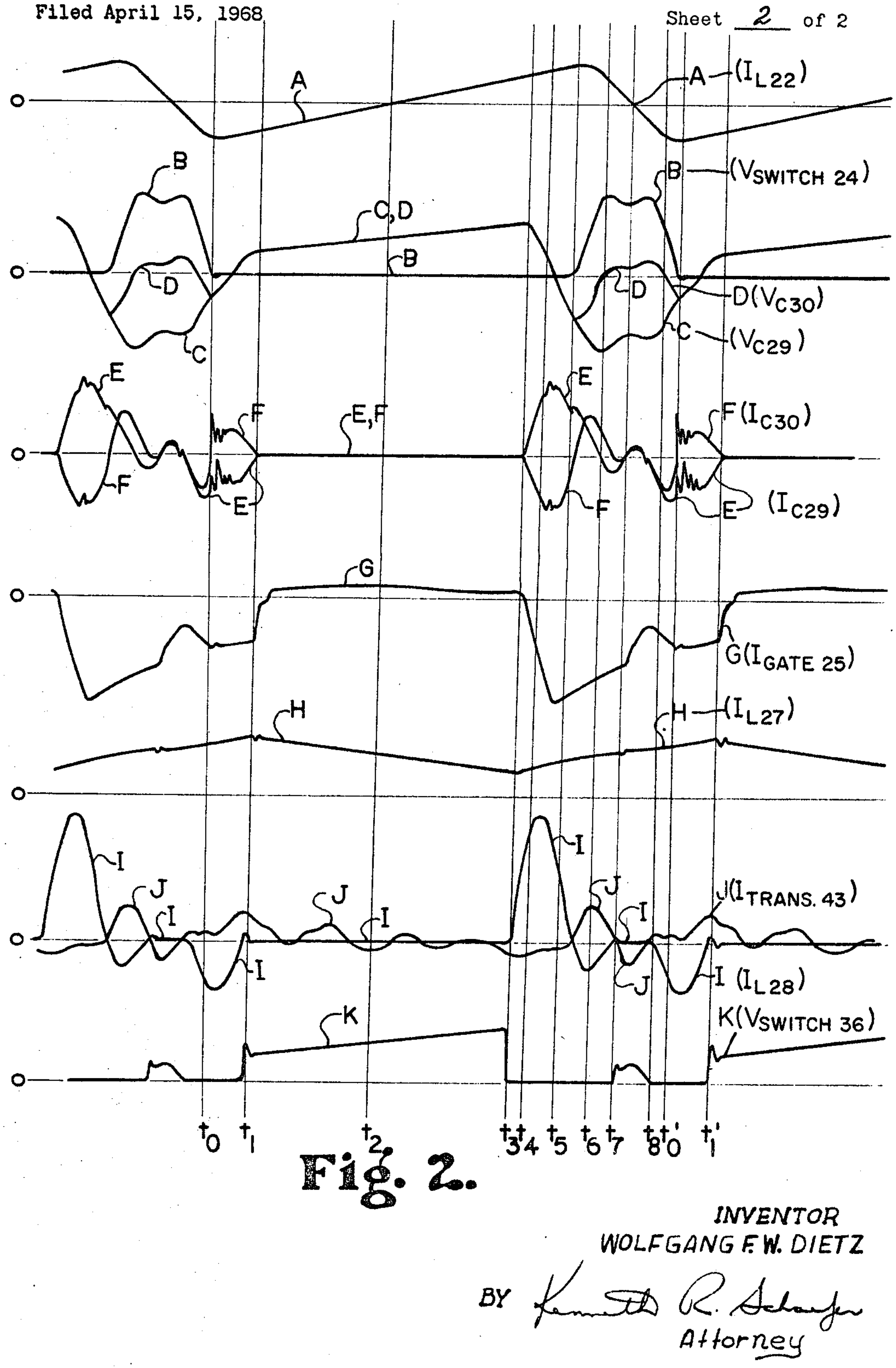

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawing, in which:

FIGURE 1 is a schematic circuit diagram partially in block diagram form, of a television receiver embodying the invention; and FIGURE 2 is a series of waveform diagrams (not drawn to scale) to which reference will be made in the explanation of the operation of the circuit of FIGURE 1.

Referring now to FIGURE 1 of the drawing, an embodiment of the invention will be described as it may be used in a typical television receiver. The television receiver includes an antenna 10 which receives composite television signals and couples the received signals to a tuner-second detector 11. The tuner-second detector 11 normally includes a radio frequency amplifier, a frequency converter for converting the radio frequency signals to intermediate frequency signals, an intermediate frequency amplifier and a detector for deriving composite television signals from the intermediate frequency signals. The television receiver further includes a video amplifier 12.

The amplified image brightness-representative portion of the composite television signal produced by video amplifier 12 is applied to the control electrode (e.g. the cathode) of a television kinescope 13. The composite television signal is also applied from video amplifier 12 to a synchronizing signal separator circuit 14. The sync separator circuit 14 supplies vertical synchronizing pulses to a vertical deflection signal generator 15. Vertical deflection signal generator 15 is connected to a vertical deflection output circuit 16, terminals Y–Y′ of which are connected to a vertical deflection winding 17 associated with kinescope 13

Horizontal synchronizing pulses are derived from sync separator circuit 14 and are supplied to a phase detector 18, the latter also being supplied with a second signal related in time occurrence to the operation of a horizontal oscillator 19. An error voltage is developed in phase detector 18 and is applied to horizontal oscillator 19 to synchronize the output of the latter with the horizontal synchronizing pulses. The output developed by horizontal oscillator 19 is supplied by means of a transformer 20 to a horizontal deflection circuit 21 constructed in accordance with the present invention.

Deflection circuit 21 serves to produce in horizontal deflection windings 22 a sawtooth deflection current waveform having a trace portion and a retrace portion. In deflection circuit 21, a first source of or means for supplying electrical energy comprising a capacitor 23, across which there is developed a relatively constant voltage, is coupled to deflection winding 22 during the trace portion of the deflection cycle by means of a first controllable bi-directionally conductive switching means 24. Switching means 24 comprises the parallel combination of a silicon controlled rectifier (SCR) 25 and a damper diode 26, diode 26 being arranged to conduct current in a direction opposite to the direction of conduction of SCR 25. The deflection circuit 21 further comprises a second source of or means for supplying electrical energy including a relatively large inductor 27 coupled to the B+ voltage supply (e.g. +150 volts) provided for the television receiver. Reactive circuit means comprising the series combination of a first inductance 28 and a first capacitance 29 coupled between inductor 27 and one terminal of switching means 24 and a second capacitance 30 coupled between the other terminal of switching means 24 (i.e. ground) and the junction of inductance 28 and capacitance 29 is provided.

Circuit means comprising a winding 31 inductively associated with inductor 27, a capacitor 32, the parallel combination of an inductor 33 and a resistor 34 and a further resistor 35 are coupled to the gate electrode of SCR 25 for rendering SCR 25 conductive at a predetermined time during the trace portion of each deflection cycle.

A second controllable bi-directionally conductive switching means 36 is coupled between the junction of inductors 27 and 28 and a point of reference voltage (i.e. ground). The switching means 36, like switching means 24, comprises the parallel combination of a silicon controlled rectifier (SCR) 37 and an energy recovery diode 38, diode 38 being arranged to conduct current in a direction opposite to the direction of conduction of SCR 37.

Circuit means are provided for rendering switching means 36 conductive prior to the retrace portion of each deflection cycle. This latter circuit means comprises the transformer 20, resistors 39 and 40, diode 41 and capacitor 42 via which the output of horizontal oscillator 19 is coupled to the gate electrode of SCR 37.

An output transformer 43 is provided having a primary winding **43*a* coupled across the combination of capacitor 23 and deflection winding 22, a secondary winding 43*b* coupled to phase detector 18 for providing flyback or retrace pulses to phase detector 18 for controlling the operation of oscillator 19 and a high voltage winding 43*c* coupled to a high voltage rectifier 44**.

Rectifier 44 is coupled to the ultor electrode (or final anode) of kinescope 13 for providing at that electrode a substantial voltage (e.g. of the order of 20–27,000 volts) for acceleration of the electron beam in kinescope 13.

The low voltage end of primary winding 43*a* is coupled to ground by means of a first protective circuit means comprising a capacitor 45 coupled between ground and winding 43*a* by means of the parallel combination of a diode 46 and a resistor 47. A second protective circuit means comprising a clamp diode 48, a capacitor 49 and a bias resistor 50 coupled to the B+ supply is also coupled across switching means 24.

In the operation of the receiver shown in FIGURE 1, a television signal at radio frequency is received by antenna 10. The received signal is amplified, converted to an intermediate frequency, further amplified and then detected by means of tuner-second detector 11. The image-representative portions of the signal are then amplified in video amplifier 12 and amplified video signals are applied to kinescope 13. The detected television signal also is applied to synchronizing signal separator circuit 14. Sync separator circuit 14 separates the deflection synchronizing signals from the composite television signal and supplies vertical synchronizing signals to vertical deflection signal generator 51 and horizontal synchronizing signals to phase detector 18. Output pulses generated by vertical deflection signal generator 15 are supplied to vertical deflection output circuit 16 which, in turn, supplies a suitable sawtooth of current at field frequency to the vertical deflection winding 17 coupled across terminals Y–Y'.

Referring to FIGURE 2, current and voltage waveforms at various points in horizontal deflection circuit 21 of FIGURE 1 are shown as they appear during typical horizontal or line deflection cycles. The trace portion of a horizontal deflection cycle is indicated as occurring during the time interval $t_0$ to $t_5$ while the retrace portion of the cycle occurs during the interval $t_5$ to $t_0'$. The interval $t_3$ to $t_1'$ will be referred to as the commutating portion of the cycle. Typically, the interval $t_0$ to $t_5$ is about 50.5 microseconds in duration while the interval $t_5$ to $t_0'$ is about 13 microseconds in duration.

In the horizontal deflection circuit 21, the operation of the first or trace switching means 24 now will be considered. The trace switching means 24 is intended to operate to connect a substantially constant voltage supply (capacitor 23) across deflection winding 22 throughout the trace portion of the deflection cycle so as to produce a substantially linear current in the inductive deflection winding 22 during trace. Specifically, immediately preceding the start of trace ($t_0$), the current in deflection winding 22 (waveform A) is approaching its maximum amplitude flowing in the direction within winding 22, for example, from terminal X to terminal X'. A flyback voltage pulse (waveform B) which appears across the combination of winding 22 and capacitor 23 is declining and passes through zero (i.e. the voltage across winding 22 exceeds that across capacitor 23). As this voltage reverses, the diode 26 in the first or trace switching means 24 is biased for conduction, applying the substantially constant voltage (e.g. +50 volts) developed across capacitor 23 to the deflection winding 22. As a result, during the first half of the trace portion of the deflection cycle ($t_0$ to $t_2$), the current in deflection winding 22 (waveform A) declines in a substantially linear manner towards zero, supplying energy to capacitor 23. Capacitor 23 is chosen sufficiently large so that the voltage across it does not change appreciably. Approximately midway through the trace portion of the cycle ($t_2$), the current through deflection winding 22 reverses and switches from damper diode 26 to SCR 25. In preparation for this switching of current paths, SCR 25 is placed in a "standby" condition during the first half of trace by means of a gate signal (waveform G) provided via winding 31 and components 32–35.

The polarity of the portion of the gate signal occurring during trace is arranged to enable conduction in SCR 25 when the main (anode-cathode) conduction path is forward biased. This latter condition takes place approximately midway through trace ($t_2$) so that the deflection current is transferred from diode 26 to SCR 25 at that time. Capacitor 23 remains connected across winding 22. However, energy is transferred from capacitor 23 to winding 22 as the deflection current in winding 22 increases in a substantially linear manner during the latter half of the trace interval.

Trace switching means 24, which is conductive throughout the trace portion of each deflection cycle, serves not only to couple deflection winding 22 to capacitor 23 but also to couple capacitors 29 and 30 in parallel. As long as commutating switch 36 is open (i.e. time $t_1$ to $t_3$), a charging circuit path including the B+ supply and inductors 27 and 28 is completed to capacitors 29 and 30. Inductance 27, which stores energy during the commutating portion of each cycle (see below), transfers some of its stored energy to capacitors 29 and 30 when they are coupled in parallel to inductor 27. That is, during the time $t_1$ to $t_3$, the current in inductor 27 charges capacitors 29 and 30 via inductor 28, producing equal increasing voltages of the polarity indicated in FIGURE 1 (see also FIGURE 2, waveforms C and D, respectively).

Approximately eight microseconds before the end of the trace portion of each deflection cycle (i.e., at $t_3$), a pulse is produced by oscillator 19 (see below for timing control), the pulse is shaped by the components 39–42 and the resultant waveform is applied to the gate electrode of SCR 37. SCR 37 is thereby rendered conductive to initiate the commutating portion of the cycle, a sequence of events leading to the occurrence of the retrace portion of the deflection cycle. Specifically, when SCR 37 is triggered into conduction by oscillator 19, a first closed circuit path comprising the trace switching means 24, capacitor 29, inductor 28 and the second or commutating switching means 36 and a second closed circuit path comprising the commutating switching means 36, inductor 28 and capacitor 30 are completed. The current in deflection winding 22 continues to increase linearly since trace switch 24 remains closed. The substantial energy which has been stored in capacitors 29 and 30 up to this time ($t_3$) is circulated in the first and second circuit paths at a resonant frequency determined by the combination of capacitors 29 and 30 with inductor 28 (see waveforms E, F and I for current associated, respectively, with capacitor 29, capacitor 30 and inductor 28). Furthermore, since switching means 36 is conductive, inductor 27 is coupled substantially directly across the B+ supply producing an approximately linearly increasing direct current through and substantial energy storage in inductor 27 (see waveform H).

When commutating SCR 37 is rendered conductive (at $t_3$), a current component supplied by capacitor 29 commences flowing through trace SCR 25 in the reverse direction, the later being possible since, at the same time, a substantial current (the sum of the currents in deflection winding 22—waveform A and transformer 43—waveform J) is flowing in the forward direction through trace SCR 25. The current associated with capacitor 29, however, which varies in a resonant manner, increases more rapidly than the substantially linearly increasing deflection current so that, after a predetermined time interval (e.g. 4 microseconds) the net current through SCR 25 reverses (at $t_4$). SCR 25 therefore is turned "off." The sum of the resonant current of capacitor 29, the deflection current and the transformer current then switch to diode 26 (since the net current is in the forward conduction direction for diode 26) until the resonant current again decreases to the level of the sum of the deflection and transformer currents. At that time, ($t_5$) diode 26 is switched off (i.e. to its high impedance condition) thereby "disconnecting" winding 22 from the constant trace voltage supply (capacitor 23).

The time interval ($t_4$ to $t_5$) during which current passes through diode 26 is arranged to be of sufficient duration to permit the removal of all stored charge carriers in SCR 25 thereby insuring that SCR 25 will remain off until the required standby trigger is applied to its gate electrode during the trace portion of the succeeding deflection cycle. The retrace interval commences ($t_5$—note waveform B) as the approximate ground potential previously maintained by trace switch 24 at the junction of windings 43*a* and 43*c* is removed.

During the time interval $t_3$ to $t_5$, while both switch 24 and switch 36 were closed, energy exchanges occurred between capacitor 29 and inductor 28 and between capacitor 30 and inductor 28, resulting in a reversal of the voltages across capacitors 29 and 30. Typically, the voltage across capacitors 29 and 30 at the beginning of retrace ($t_5$) is almost equal to but of opposite polarity with respect to the voltage thereon at the beginning of the commutating interval ($t_3$). Some current (energy) remains in inductance 28 at the beginning of retrace (see waveform I).

During the retrace interval ($t_5$ to $t_0'$), a complex sequence of energy exchanges takes place among the deflection winding 22, inductance 28, capacitors 29 and 30 and the high voltage supply circuit including transformer 43, rectifier 44 and the load at the kinescope high voltage terminal (+H.V.). Stated briefly, the current in deflection windings 22 is reversed as a result of a resonant half-cycle energy exchange with the combination of inductor 28, capacitors 29 and 30 and the equivalent tuned circuit of transformer 43 (see waveform A). The leakage inductance and distributed capacitance associated with transformer 43 preferably are selected to resonate at approximately the third harmonic of the retrace frequency.

As stated above, energy was supplied to capacitors 29 and 30 during the trace interval by means of the current provided via inductor 27 (see waveform H). Some of this energy is supplied to the high voltage circuit (see, e.g., waveform J—current in transformer 43) and some is supplied to the deflection windings 22 to replace energy dissipated and/or used in the circuit during the preceding trace interval. The magnitude of energy transferred to the deflection windings and to the high voltage circuit can be illustrated by referring to voltage waveforms C and D at the times $t_3$ and $t_1'$ (i.e. the beginning and end of the commutating interval). It can be seen that the voltage across capacitors 29 and 30 is greater at the beginning of the commutating interval ($t_3$) than at the end thereof ($t_1'$). This voltage difference is representative of energy consumed in the system during one cycle.

The manner in which energy is exchanged during retrace is of particular interest and one manner of describing such energy exchanges will be presented.

At any particular time, the energy storage condition of circuit components may be determined by referring to the waveforms of voltage (capacitors) or current (inductors) in FIGURE 2.

At the start of retrace ($t_5$), the deflection windings 22, capacitors 29 and 30 and inductor 28 all are storing energy. Transformer 43 stores comparatively little or no energy at this time. Capacitor 29 and deflection windings 22 are at or near their maximum stored energy conditions, the energy in inductor 28 is below its maximum level and is declining and the energy in capacitor 29 is substantially below its maximum level but is increasing.

When the trace switch 24 opens, capacitor 29 is coupled to a relatively long time constant circuit principally comprising deflection winding 22 and transformer 43 while capacitor 30 is coupled to a shorter time constant circuit comprising inductor 28. Since the deflection windings 22 no longer are clamped by trace switch 24 to the voltage across capacitor 23, the voltage across switch 24 (waveform B) begins to rise and, at the same time, the current (and energy) in deflection windings 22 begins to decline at a rate which is relatively fast as compared with the rate of change of the same current during trace but which is slower than the rate of change of other circuit currents at this time.

During the interval $t_5$ to $t_7$ (first half of retrace) the current (and therefore the associated energy) of deflection windings 22 divides between a circuit path including transformer 43 and a circuit path including capacitor 29. Initially, capacitor 29 takes the larger share of the deflection current and the voltage across capacitor 29 increases (i.e. stored energy increases). At $t_6$, the declining current in capacitor 29 decreases to zero, the voltage across capacitor 29 reaches its peak and all of the current of windings 22 is being supplied to transformer 43. Capacitor 30, during this interval, is supplying energy to inductor 28.

During the interval $t_6$ to $t_7$, capacitor 29, deflection winding 22 and, to a lesser degree, inductor 28 supply energy to transformer 43. A portion of this energy is utilized in the vicinity of the time $t_7$ to replenish via rectifier 44 the losses in the high voltage circuit of kinescope 13. The inclusion in the circuit of capacitor 30 makes it possible to supply substantial current to the high voltage circuit while maintaining a relatively high flyback voltage pulse (waveform B).

The remainder of the energy supplied to transformer 43 (after supplying high voltage losses) is returned to deflection windings 22 during the second half of retrace ($t_7$ to $t_8$). Additional energy is also supplied to deflection windings 22 from capacitor 29 during the interval $t_8$ to $t_0'$. Fourthermore, during the interval $t_8$ to $t_0'$, capacitor 29 supplies some energy to capacitor 30 as the voltages across those two capacitors approach each other again. When the voltages across capacitors 29 and 30 are equal, diode 26 in trace switch 24 is again rendered conductive and the next trace interval begins.

As the currents associated with capacitors 29 and 30 varied during retrace, the current through switching means 36 (see waveform I) changed direction between $t_5$ and $t_6$ such that SCR 37 was rendered non-conductive shortly after $t_5$. That is, as the capacitor 30 discharged through inductor 28 and switch 36, the current in inductor 28 reversed (see waveform I). SCR 37 turns "off" when this current reversal occurs and the combination of currents associated with capacitors 29 and 30 (waveforms E and F) switch to diode 38. As noted in connection with the operation of trace switch 24, if diode 38 conducts for a sufficiently long time, the stored charge carriers in rectifier 37 will be removed and rectifier 37 will be incapable of conducting again until triggered at its gate (see waveform K—voltage across switch 36 which indicates switch 36 is "open" between $t_7$ and $t_8$). At $t_8$, diode 38 once again is rendered conductive as that portion of the current in deflection windings 22 which flows through capacitor 29 increases sufficiently to exceed the current component associated with capacitor 30. Diode 38 conducts until the end of the commutating interval ($t_1'$) as capacitors 29 and 30 complete a half-cycle energy exchange with inductor 28. Diode 38 switches "off" at the end of this half-cycle exchange. Capacitors 29 and 30 then again begin charging via inductor 27.

It was previously stated that oscillator 19 is arranged to produce a pulse approximately eight microseconds before the end of the trace portion of each deflection cycle. The manner in which the timing of such pulses is maintained now will be explained. Horizontal retrace pulses generated across windings 43*b* of transformer 43, which are related in time occurrence to the pulses generated by horizontal oscillator 19 (at a normal frequency of 15,750 cycles per second), are applied to phase detector 18. The retrace pulses (or a waveform derived therefrom) are compared in phase detector 18 with the horizontal synchronizing pulses supplied from sync separator circuit 14. Phase detector 18 develops an error voltage which (in turn, is applied to horizontal oscillator 19 to control the oscillator phase and frequency.

The horizontal output pulses produced by oscillator 19 are shaped so as to provide positive pulses having a repetition rate of 15,750 cycles per second and the desired time relationship with respect to the horizontal blanking or retrace interval.

In a horizontal deflection circuit of the type described which also is arranged to produce high voltage for an associated kinescope, it is desirable that provision be made to maintain image width substantially constant while accommodating a varying load on the high voltage supply (i.e. a varying kinescope beam current which is representative of variations in image brightness).

Image width can be maintained constant even though kinescope high voltage varies as long as the deflection current supplied to windings 22 is also varied in a predetermined compensating manner. As is well known, for small variations, the percentage change in deflection current should be approximately one-half the percentage change in high voltage to maintain constant image width As was stated above, the magnitude of the current in deflecting windings 22 at the beginning of trace (i.e. the peak deflection current) is dependent in part on the amount of energy returned by transformer 43 to windings 22 in the last half of retrace. The amount of energy returned, in turn, varies in the same sense as the variations in high voltage which are caused by changes in beam current. Furthermore, variations in the voltage across capacitors 29 and 30 at the end of retrace are in the same sense as the variations in high voltage which are caused by changes in beam current. During trace, the rate at which inductor 27 charges capacitors 29 and 30 is inversely related to the voltage across those capacitors at the end of retrace. Therefore, the energy supplied to capacitors 29 and 30 during trace, which ultimately is available during retrace to supply losses in the high voltage and deflection portions of the circuit, varies in the same sense as beam current in kinescope 13.

It is therefore possible to proportion the component values in deflection circuit 21 such that as beam current in kinescope 13 varies a compensating variation in the energy supplied to deflection circuit 21 is produced, thereby maintaining variations in the high voltage supplied to kinescope 13 within predetermined limits. Furthermore, the component values can be proportioned such that with relatively small variations in high voltage caused by changes in beam current, the current supplied to deflection windings 22 is permitted to vary in a compensating sense so as to maintain image width substantially constant.

Capacitor 29 is selected with respect to the inductance value of deflection windings 22 and the equivalent impedances of the high voltage circuit including transformer 43 so as to provide the desired retrace time interval.

Capacitor 30 and inductor 28 along with inductor 27 are selected so as to provide the required energy and the desired variation thereof with changes in kinescope beam current to maintain image substantially constant as beam current varies.

Typically, capacitor 30 is selected smaller than capacitor 29 while inductor 28 is selected smaller than the inductance of any deflection windings 22, transformer 43 and inductor 27. It has been found that particularly suitable operation of the circuit is obtained when the natural frequency of oscillation associated with capacitor 30 during retrace is selected approximately equal to an even harmonic of the retrace frequency.

In addition to providing additional energy storage capability for deflection circuit 21, and to functioning in turning off SCR 37, capacitor 30 provides the advantage of preventing an excessive rate of change of voltage across trace switch 24 at the beginning of retrace (i.e. the combination of capacitors 29 and 30 across switch 24 prevents instantaneous change of the voltage).

While the invention has been described in terms of a particular embodiment, modifications may be made which are within the scope of the invention. For example, a further reduction in the voltage which appears across trace switch 24 during retrace may be realized by coupling trace switch 24 to a lower tap on primary winding 43_a_. Furthermore, deflection windings 22 may be coupled to a different point on transformer 43 than that shown. In fact, transformer 43 need not be of the autotransformer variety as shown but rather a separate high voltage winding as well as additional windings may be provided.

One particular circuit configuration as shown in FIGURE 1 utilizes the following component values:

| | |
|---|---|
| Deflection winding **22** | 450 microhenries. |
| Capacitor **23** | 1.5 microfarads. |
| SCR **25** | RCA type 37699. |
| Diode **26** | Type IN4826. |
| Inductor **27** | 15 millihenries. |
| Inductor **28** | 60 microhenries. |
| Capacitor **29** | .068 microfarad. |
| Capacitor **30** | .047 microfarad. |
| SCR **37** | RCA type 37700. |
| Diode **38** | Type IN4826. |
| Transformer **43** | 1.2 millihenries (primary); 120 microhenries (leakage); .022 microfarad (distributed C). |

What is claimed is:

1. In a television receiver having an image display device, a deflection and high voltage generation circuit for supplying to said display device high voltage and a deflection current having trace and retrace portions comprising
- a deflection winding,
- a first means for supplying energy,
- first switching means operable between conductive and non-conductive states for coupling said deflection winding to said energy supplying means when in said conductive state,
- second switching means operable between conductive and non-conductive states,
- reactive circuit means comprising the series combination of a first capacitance and a first inductance coupled between said first and second switching means and a second capacitance coupled from the junction of said first capacitance and said first inductance to said first switching means remote from said series combination,
- high voltage generating means coupled across said deflection winding for supplying high voltage to said image display device, and
- means for rendering said first and second switching means conductive at times corresponding to the beginning and prior to the end, respectively, of said trace portion.

2. The combination according to claim 1, and further comprising
- a second means for supplying energy coupled to the junction of said second switching means and said series combination.

3. The combination according to claim 1 wherein said first and second switching means are each bidirectionally conductive.

4. The combination according to claim 2 wherein said first capacitance is of greater capacitance value than said second capacitance.

5. The combination according to claim 4 and further comprising
- a second means for supplying energy comprising a voltage supply and an inductor of relatively large inductance value coupled to the junction of said second switching means and said series combination.

6. The combination according to claim 5 wherein said first capacitance and said first inductance are coupled between said first and second switching means in the named order.

7. The combination according to claim 5 wherein said second capacitance is selected, with respect to the equivalent inductance associated therewith during retrace, so as to resonate with a natural frequency approximately equal to an even harmonic of the retrace frequency.

8. The combination according to claim 7 wherein said high voltage generating means comprises a transformer coupled across said first switching means, said transformer having an associated leakage inductance and distributed capacitance selected to resonate at a frequency approximately equal to the third harmonic of the retrace frequency.

9. The combination according to claim 8 wherein said first capacitance is selected with respect to the inductance of said deflection winding such that current in said deflection winding resonates during retrace at a natural frequency having a period substantially twice the retrace interval.

10. The combination according to claim 9 wherein each of said switching means comprises a silicon controlled rectifier and a diode coupled across said rectifier.

11. In a television receiver, a deflection circuit for producing a deflection current having trace and retrace portions comprising a deflection winding, a first means for supplying energy for providing a substantially constant voltage, first switching means operable between conductive and non-conductive states for coupling said deflection winding to said energy supplying means when in said conductive state, second switching means operable between conductive and non-conductive states, reactive circuit means comprising the series combination of a first capacitance and a first inductance coupled between said first and second switching means and a second capacitance coupled from the junction of said first capacitance and first inductance to said first switching means remote from said series combination, and means for rendering said first and second switching means conductive at times corresponding to the beginning and prior to the end, respectively, of said trace portion.

12. The combination according to claim 11 and further comprising a second means for supplying energy comprising a voltage supply and an inductor having a relatively large inductance value coupled to the junction of said second switching means and said series combination.

13. The combination according to claim 12 wherein each of said switching means is bi-directionally conductive.

14. The combination according to claim 13 wherein said first capacitance is of greater capacitance value than said second capacitance.

15. The combination according to claim 14 wherein the capacitance value of said first capacitance is selected such that current in said deflection winding resonates during retrace at a frequency having a natural period substantially equal to twice the retrace interval.

16. The combination according to claim 15 wherein said first inductance is selected of substantially smaller value than the inductance of said deflection windings.

17. The combination according to claim 11 wherein each of said switching means comprises the parallel combination of a silicon controlled rectifier and a diode coupled for bi-directional current conduction by said switching means.

18. The combination according to claim 17 and further comprising means for rendering said silicon controlled rectifier in said first switching means conductive approximately at the middle of the trace interval.

19. The combination according to claim 18 wherein said diode in said first switching means is poled for conduction of current through said deflection winding during the first half of the trace interval.

20. The combination according to claim 19 wherein said silicon controlled rectifier in said second switching means is poled for conducton immediately prior to and during the initial portion of the retrace interval.

21. The combination according to claim 20 wherein said diode in said second switching means is poled for conduction in a direction opposite to its associated silicon controlled rectifier.

No references cited.

RODNEY D. BENNETT, Jr., *Primary Examiner.*

J. G. BAXTER, *Assistant Examiner.*

UNITED STATES PATENT OFFICE
CERTIFICATE OF CORRECTION

Patent No. 3,452,244 Dated June 24, 1969

Inventor(s) WOLFGANG F. W. DIETZ

It is certified that error appears in the above-identified patent and that said Letters Patent are hereby corrected as shown below:

Column 4, line 55, that portion reading "later" should read --latter--. Column 6, line 30, that portion reading "forthermore" should read --furthermore--; line 68, that portion reading "normal" should read --nominal--; line 74, delete parentheses. Column 7, line 21, that portion reading "deflecting" should read --deflection--; line 57, between "image" and substantially" insert --width--. In Figure 2, waveform G, the legend which reads "($I_{GATE\ 25}$)" should read --($V_{GATE\ 25}$)--.

Signed and sealed this 25th day of January 1972.

(SEAL)
Attest:

EDWARD M.FLETCHER,JR.
Attesting Officer

ROBERT GOTTSCHALK
Commissioner of Patents